(12) United States Patent
Hoppe et al.

(10) Patent No.: US 9,859,701 B2
(45) Date of Patent: Jan. 2, 2018

(54) CONNECTION OF AT LEAST FOUR ELECTRIC CONDUCTORS

(71) Applicant: SIEMENS AKTIENGESELLSCHAFT, Munich (DE)

(72) Inventors: Jens Hoppe, Schwarzenbruck (DE); Karsten Loppach, Nuremberg (DE); Thomas Wende, Burgthann (DE); Rene Martin Wimmer, Postbauer-Heng (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/021,033

(22) PCT Filed: Aug. 28, 2014

(86) PCT No.: PCT/EP2014/068234
§ 371 (c)(1),
(2) Date: Mar. 10, 2016

(87) PCT Pub. No.: WO2015/036248
PCT Pub. Date: Mar. 19, 2015

(65) Prior Publication Data
US 2016/0254657 A1 Sep. 1, 2016

(30) Foreign Application Priority Data
Sep. 10, 2013 (EP) .................................. 13183721

(51) Int. Cl.
*H02G 15/08* (2006.01)
*H01F 27/04* (2006.01)
(Continued)

(52) U.S. Cl.
CPC ............. *H02G 15/08* (2013.01); *H01B 17/26* (2013.01); *H01F 27/04* (2013.01); *H01F 27/2828* (2013.01); *H01R 9/0506* (2013.01)

(58) Field of Classification Search
CPC .... H01R 9/0524; H01R 13/622; H01R 24/38; H01R 2103/00; H01R 13/6592;
(Continued)

(56) References Cited

U.S. PATENT DOCUMENTS 2,337,155 A 12/1943 Dibner
2,567,783 A 9/1951 Richardson
(Continued)

FOREIGN PATENT DOCUMENTS

CN 1101176 A 4/1995
CN 2282274 Y 5/1998
(Continued)

*Primary Examiner* — Truc Nguyen
(74) *Attorney, Agent, or Firm* — Laurence A. Greenberg; Werner H. Stemer; Ralph E. Locher

(57) ABSTRACT

A connection element for electrically conductive connections of at least four electric conductors. The connection element has a metallic electrode which has a cavity for merging the conductors and an opening into the cavity for each conductor. At least the outer surface of the electrode is surrounded with a paper insulation.

15 Claims, 4 Drawing Sheets

(51) Int. Cl.
*H01F 27/28* (2006.01)
*H01R 9/05* (2006.01)
*H01B 17/26* (2006.01)

(58) Field of Classification Search
CPC ........ H01R 9/0521; H01R 24/40; H01R 9/05;
H01R 12/721; H01R 12/774; H01R
12/79; H01R 13/6473; H01R 31/065;
H01R 43/26
See application file for complete search history.

(56) References Cited

U.S. PATENT DOCUMENTS

| | | | |
|---|---|---|---|
| 3,001,000 A | 9/1961 | Wantz, Jr. | |
| 4,559,421 A * | 12/1985 | Lapke | H01R 24/46 200/2 |
| 5,317,474 A | 5/1994 | Capper et al. | |
| 5,511,995 A * | 4/1996 | Cheng | H01R 13/6633 439/224 |
| 5,624,286 A | 4/1997 | Marco | |
| 5,820,404 A | 10/1998 | Chishima et al. | |
| 6,227,908 B1 * | 5/2001 | Aumeier | H01R 13/6593 439/186 |
| 6,276,970 B1 * | 8/2001 | Wong | H01R 24/542 439/578 |
| 6,733,341 B1 * | 5/2004 | Bugg | H01R 31/02 439/638 |
| 6,890,191 B1 | 5/2005 | Thorburn | |
| 8,124,878 B2 | 2/2012 | Hoppe et al. | |
| 8,550,842 B1 * | 10/2013 | Gutierez | H01R 4/36 174/74 R |
| 9,303,861 B2 * | 4/2016 | Li | F21V 31/04 |
| 2003/0045141 A1 | 3/2003 | Syed et al. | |
| 2003/0181105 A1 * | 9/2003 | Lee | H01R 31/02 439/638 |
| 2004/0224562 A1 * | 11/2004 | Dolinshek | H01R 31/02 439/638 |
| 2005/0130502 A1 * | 6/2005 | Scalfi | F21S 2/00 439/638 |
| 2006/0014439 A1 * | 1/2006 | Mundry | E21D 23/16 439/638 |
| 2006/0019531 A1 * | 1/2006 | Moon | H01M 2/0473 439/501 |
| 2007/0184722 A1 * | 8/2007 | Doherty | A63H 33/042 439/638 |
| 2009/0197476 A1 * | 8/2009 | Wallace | H01R 9/15 439/694 |
| 2009/0212896 A1 * | 8/2009 | Tamura | H01F 5/04 336/192 |
| 2009/0283294 A1 * | 11/2009 | Bukovnik | H01B 3/40 174/102 R |
| 2011/0250774 A1 * | 10/2011 | Raad | H01R 13/523 439/271 |
| 2015/0018909 A1 * | 1/2015 | Rebentisch | H01R 13/187 607/116 |

FOREIGN PATENT DOCUMENTS

| | | |
|---|---|---|
| DE | 102006038221 A1 | 2/2008 |
| EP | 0753900 A1 | 1/1997 |
| EP | 0624924 B1 | 9/2002 |
| FR | 797283 A | 4/1936 |
| JP | S5030018 A | 3/1975 |
| JP | S51118915 U | 9/1976 |
| JP | S5233010 U | 3/1977 |
| JP | S5837118 U | 3/1983 |
| JP | S5837119 U | 3/1983 |
| JP | S58222510 A | 12/1983 |
| JP | H0617218 U | 3/1994 |
| JP | H0669047 A | 3/1994 |
| JP | H0669048 A | 3/1994 |
| JP | H06283062 A | 10/1994 |
| WO | 9514313 A1 | 5/1995 |

* cited by examiner

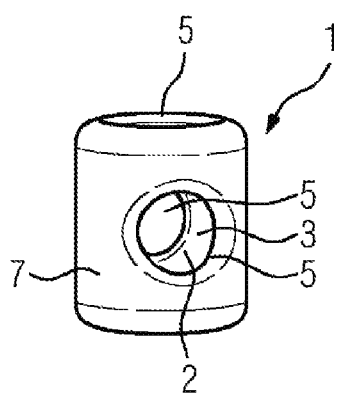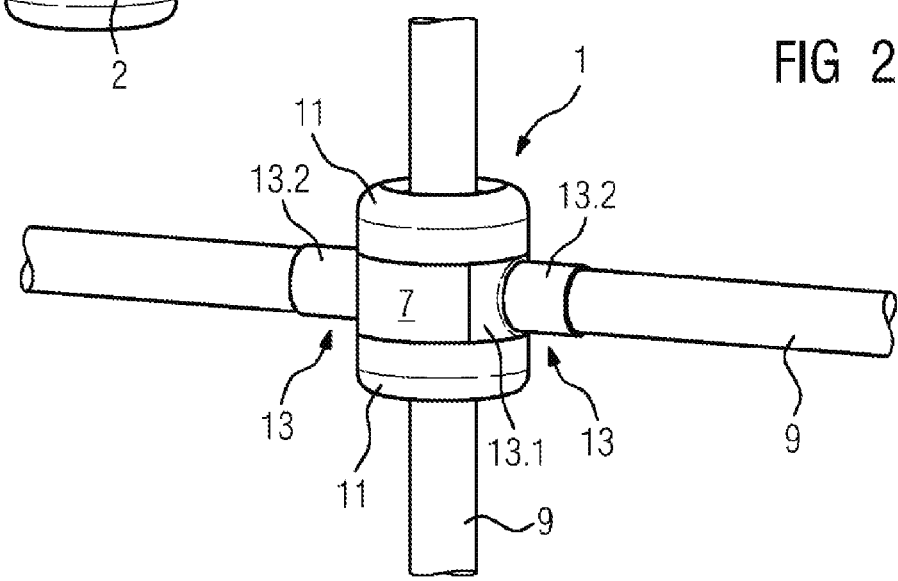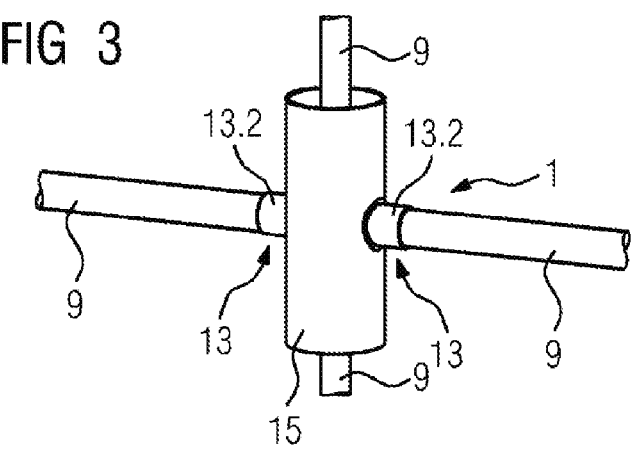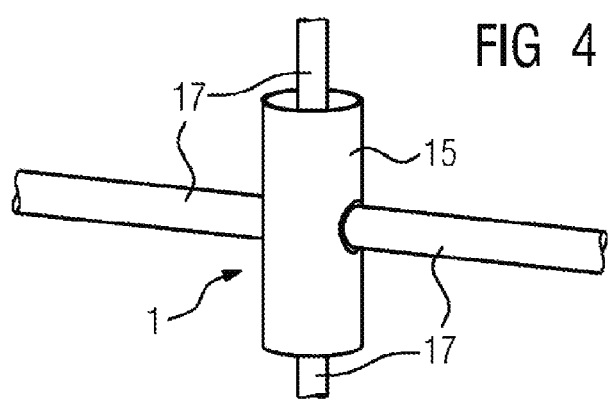

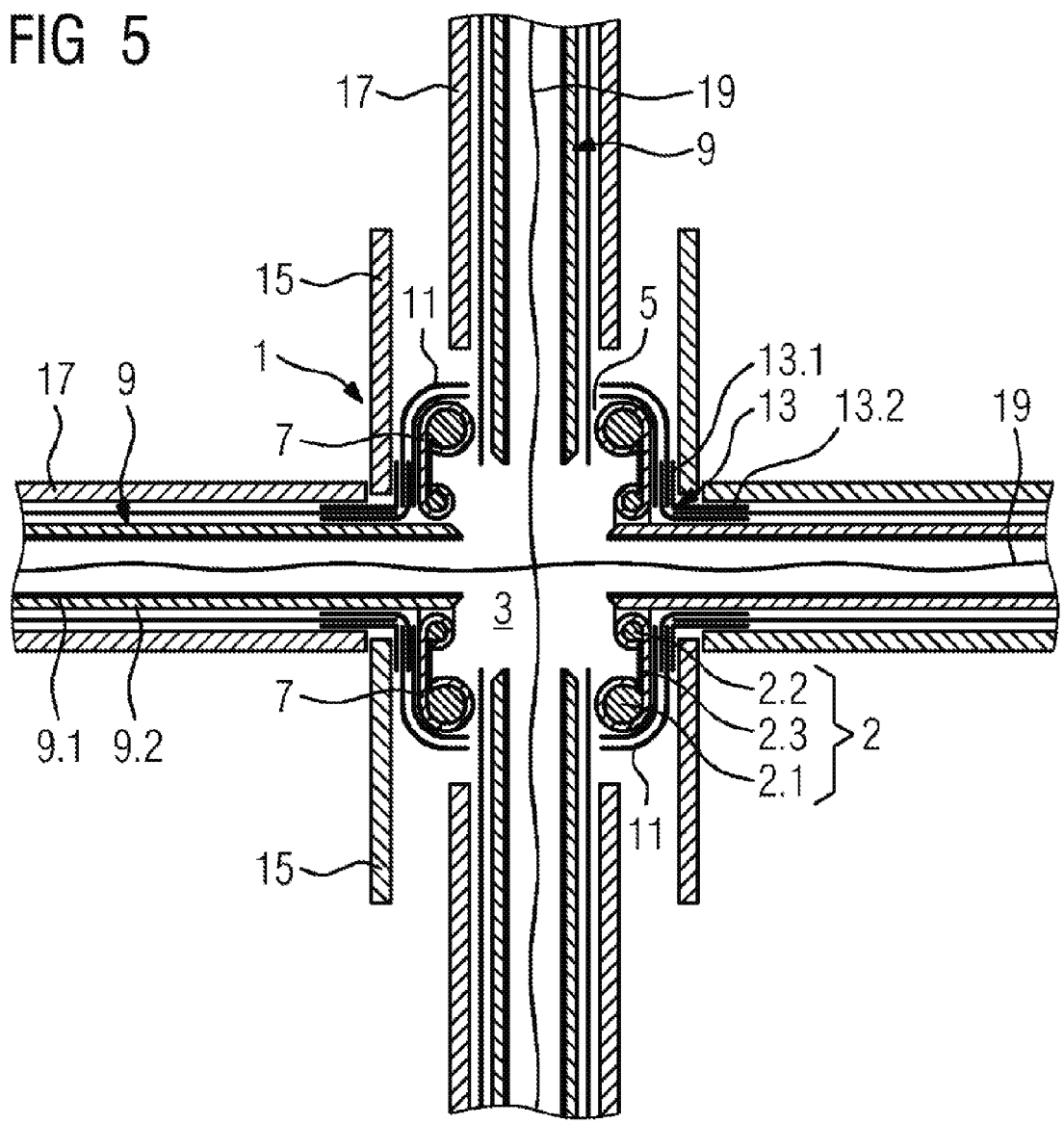

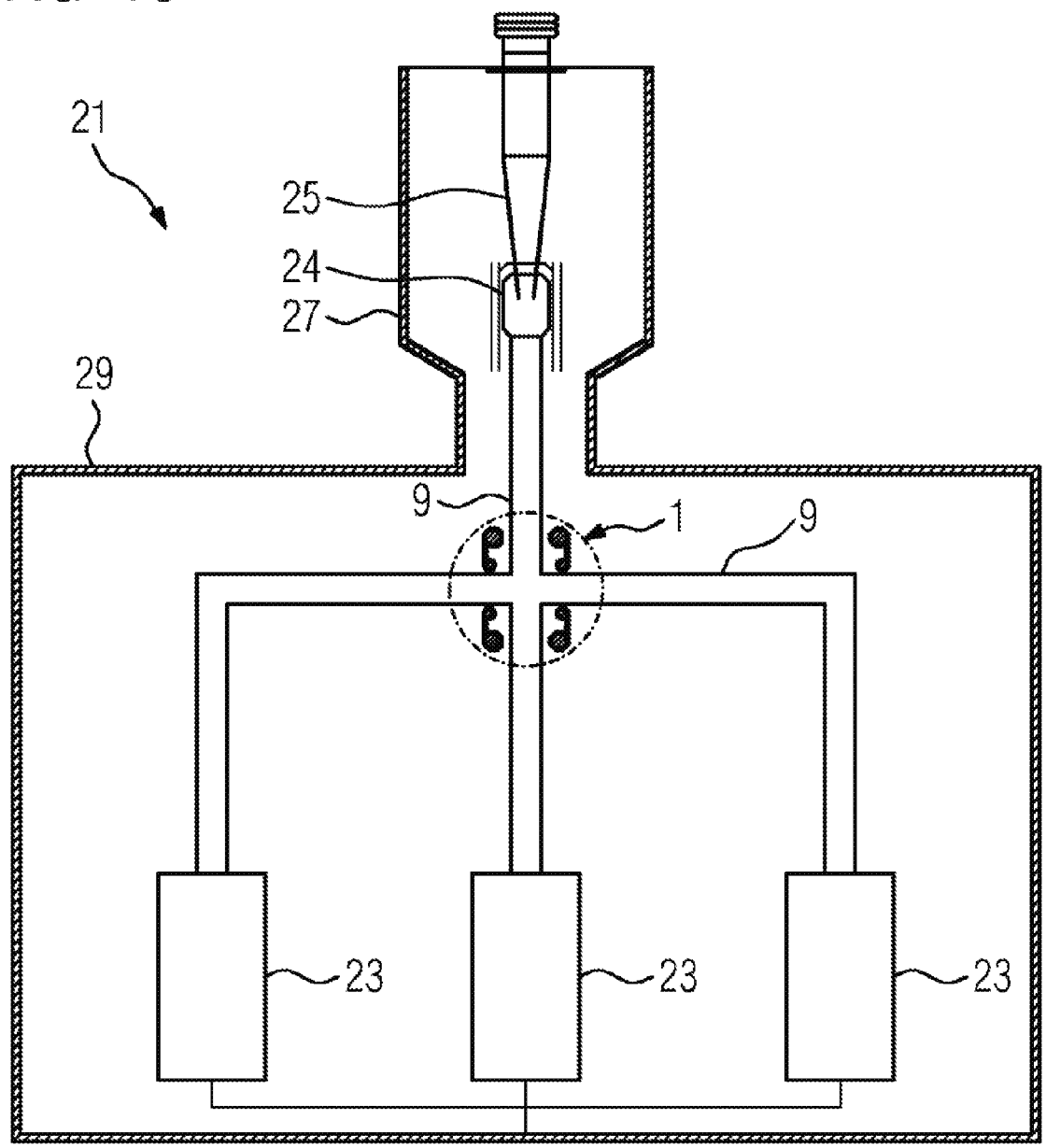

CONNECTION OF AT LEAST FOUR ELECTRIC CONDUCTORS

BACKGROUND OF THE INVENTION

Field of the Invention

The invention relates to a connection element for electrically conductively connecting at least four electrical conductors, and also to the use of a connection element of this kind.

In electrical devices and installations such as transformers or choke coils, current-carrying electrical conductors often have to be electrically connected to one another. In the process, attention should be paid to the space required between voltage-carrying components and the housing parts which surround said voltage-carrying components owing to the electrical design. The space requirement depends, in particular, on the electrical insulation properties of the connection and, respectively, the dimensions of an insulation system have to be such that said insulation system fits into a prespecified volume. Limiting factors include prespecified, usually constant, transportation dimensions of the entire device and increased requirements in respect of operating voltage, for example a supply-system-end increase in the operating voltage from 500 kV to 750 kV in HVDC transformers, that is to say in transformers for high-voltage direct-current transmission operations.

BRIEF SUMMARY OF THE INVENTION

The invention is based on the object of specifying a connection element for electrically conductively connecting at least four electrical conductors, which connection element is improved with respect to its insulation capability in particular and the geometric dimensions of which connection element are so compact that a minimum amount of space is required for said connection element in the case of high operating voltages. A further object of the invention is to specify an improved connection of at least four electrical conductors.

According to the invention, the object in respect of the connection element is achieved by the features as claimed and in respect of the connection by the features as claimed.

Advantageous refinements of the invention are the subject matter of the dependent claims.

A connection element according to the invention for electrically conductively connecting at least four electrical conductors has a metallic electrode which has a hollow space for bringing the conductors together and has an opening to the hollow space for each conductor. At least the outer surface of the electrode is surrounded by a paper insulation.

In this case, the openings in the electrode allow the conductors to be routed into the hollow space in the electrode in order to electrically connect said conductors to one another in said hollow space. A connection element of this kind advantageously allows space-saving connection of at least four conductors by virtue of the connection element being provided with suitable additional insulation elements according to the exemplary embodiments described in the text which follows if required, that is to say depending on the respective operating conditions, in particular on the respective electrical voltages.

One refinement of the invention provides that each opening has a round contour.

Corners and edges which can cause strong electric fields and therefore require relatively large distances between the electrode and the electrically conductive components which surround the electrode and have different electrical potentials can advantageously be avoided owing to the round design of the openings.

A further refinement of the invention provides that the metallic electrode is designed in a substantially cylindrical manner with two cylinder base surfaces and a cylinder lateral surface, and each cylinder base surface has an opening, and the cylinder lateral surface has at least two openings.

In this case, the cylinder base surface can be circular, oval or else be designed as a polygon with preferably rounded corners.

This refinement of the electrode allows, in particular, geometrically advantageous feeding of the conductors to the electrode and a particularly compact design of the electrode which is particularly well matched to the number of conductors.

A further refinement of the invention provides that the outer surface of the electrode is of smooth design.

In this case, a smooth outer surface is understood to mean an outer surface which does not have any points, corners and edges. An outer surface of this kind also has the advantage that points, corners and edges which can cause strong electric fields are avoided.

Further refinements of the invention provide that the electrode has at least one electrode section which surrounds an opening and which is of toroidal design or is designed as a metal sheet with an edge region which is bent over in relation to the hollow space.

As a result, points, corners and edges which can cause strong electric fields are likewise avoided in the region of the openings.

A further refinement of the invention provides at least one insulation element which is composed of pressboard and is arranged around a section of the electrode and the paper insulation of said electrode.

Additional insulation elements advantageously allow improved insulation of the connection element, in particular at high voltages. In transformers or choke coils, the connection element is additionally especially arranged in an oil-filled housing. The oil volume in the area surrounding the connection element can be subdivided several times by additional insulation elements. Subdivision of the oil volume in this way advantageously further increases the insulation capability of the connection element since an oil gap which is subdivided several times has a better insulating effect than a equal continuous oil gap.

For example, at least one first insulation element of this kind which is designed in the form of a cap around a section of the electrode with an opening and which has a hole which is arranged above the opening and corresponds to the opening can be provided.

In this case, the hole serves to route a conductor through to an opening and into the hollow space in the electrode.

As an alternative or in addition, at least one second insulation element which is designed as a so-called chimney segment and has a shield-like section and a tubular section can be provided, wherein the shield-like section surrounds a region of the electrode which contains an opening and has a hole which is arranged above the opening and corresponds to the opening, and wherein the tubular section extends from the edges of this hole to the outside, so that it forms an extension of the opening to the outside.

The hole once again permits a conductor to be routed through to an opening and into the hollow space in the electrode. The tubular section advantageously enhances the insulating effect of the insulation element in an area surrounding the connection element, the conductor running in said area.

Furthermore, at least one third insulation element which is of tubular design and is arranged around the electrode along a longitudinal axis of the electrode and, in the region of openings in the electrode, has holes which correspond to these openings can be provided.

As a result, insulation around the entire electrode is advantageously possible, without interfering with feeding of the conductors to the electrode.

A connection element according to the invention is preferably used for electrically conductively connecting at least four electrical conductors, wherein each conductor is routed through a shielding pipe, into an opening in the connection element, into the hollow space in the connection element, and the conductors are electrically connected to one another in the hollow space in the connection element.

The conductors can advantageously be electrically shielded by the shielding pipes.

In this case, each shielding pipe preferably projects, by way of one pipe end, through an opening into the hollow space in the electrode.

As a result, the stability of the connection of the conductors can advantageously be increased by the shielding pipes being inserted into the openings in the electrode and possibly being fastened there.

Furthermore, each shielding pipe can be surrounded by a tubular barrier, which is composed of pressboard, outside the connection element.

As a result, the electrical insulation of the pipes and conductors from the surrounding area is advantageously increased.

Each shielding pipe preferably has a metal pipe which is surrounded on the outside by a pipe paper insulation.

The electrical insulation of the pipes and the conductors from the surrounding area is also advantageously increased in this way.

Furthermore, the electrode is preferably electrically connected to the conductors or to the conductors and the shielding pipes in one location.

As a result, the electrodes, conductors and shielding pipes can be connected to the same electrical potential.

In particular, the connection element and the shielding pipes can be arranged in an oil within a housing of a transformer or a choke coil and electrically conductively connect at least three of the conductors to in each case one winding of the transformer or of the choke coil.

In this way, at least three windings, which are connected in parallel in particular, of a transformer can advantageously be connected to a bushing of the transformer, for example. In this case, the connection element according to the invention allows relatively small distances between the conductors and the grounded housing of the transformer since the connection element according to the above embodiments allows the oil volume in the housing to be subdivided several times by means of the paper insulation and insulation elements and therefore has a high insulation capability. In addition, the use of the connection element according to the invention allows tolerances of the conductor arrangement in the horizontal and/or vertical direction to be compensated for, with the geometry of the windings in the transformer otherwise being fixed. The same applies for the use of the connection element in a choke coil.

The above-described properties, features and advantages of this invention and the way in which said properties, features and advantages are achieved will become clearer and more easily understandable in connection with the following description of exemplary embodiments which are explained in more detail in connection with the drawings, in which:

BRIEF DESCRIPTION OF THE SEVERAL VIEWS OF THE DRAWING

FIG. 1 shows a perspective illustration of a first exemplary embodiment of a connection element for four conductors, FIG. 2 shows a perspective illustration of a second exemplary embodiment of a connection element for four conductors and also shielding pipes which carry the conductors, FIG. 3 shows a perspective illustration of a third exemplary embodiment of a connection element for four conductors and also shielding pipes which carry the conductors, FIG. 4 shows a perspective illustration of a third exemplary embodiment of a connection element for four conductors and also shielding pipes which carry the conductors and are surrounded by barriers, FIG. 5 shows a sectional illustration through the third exemplary embodiment, which is illustrated in FIG. 4, of a connection element for four conductors and also shielding pipes which carry the conductors and are surrounded by barriers.

DESCRIPTION OF THE INVENTION

Figure 7:
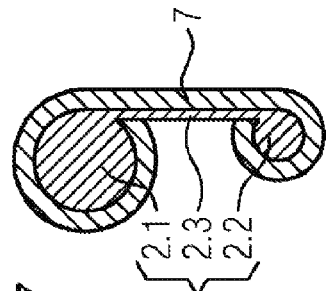
FIG. 7 shows a sectional illustration through a detail of a first exemplary embodiment of the electrode and paper insulation of a connection element for four conductors.

Parts which correspond to one another are provided with the same reference symbols throughout the figures.

FIG. 1 shows a perspective illustration of a first exemplary embodiment of an electrical connection element 1 for electrically conductively connecting four electrical conductors 19, not illustrated in FIG. 1, (see FIG. 5). The connection element 1 has a metallic electrode 2 which has a hollow space 3 for bringing the conductors 19 together and has an opening 5 to the hollow space 3 for each conductor 19.

The electrode 2 is designed in a substantially cylindrical manner with two cylinder base surfaces and a cylinder lateral surface. Each cylinder base surface has an opening 5, and the cylinder lateral surface has two openings 5 which are situated opposite one another. The openings 5 each have a round contour.

Figure 8:
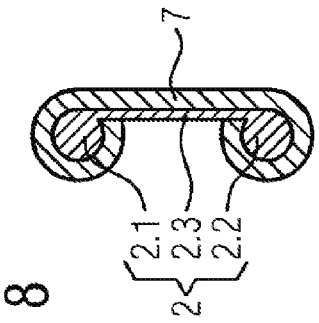
FIG. 8 shows a sectional illustration through a detail of a second exemplary embodiment of the electrode and paper insulation of a connection element for four conductors.
Figure 9:
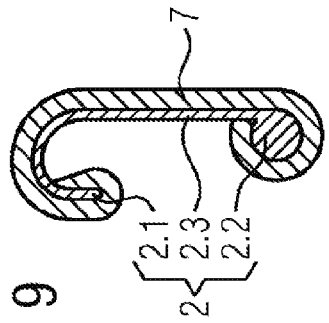
FIG. 9 shows a sectional illustration through a detail of a third exemplary embodiment of the electrode and paper insulation of a connection element for four conductors, and FIG. 10 schematically shows a transformer with a connection element for four conductors, three of which conductors are connected to a respective winding of the transformer.

The connection element 1 further has a paper insulation 7 which completely surrounds the outer surface of the electrode 2 and, depending on the design of the electrode 2, also surrounds parts of the inner surface of the electrode 2 (see FIGS. 7 to 9).

FIG. 2 shows a perspective illustration of a second exemplary embodiment of an electrical connection element 1 for electrically conductively connecting four electrical conductors 19, not shown in FIG. 2, (see FIG. 5) which are each routed in a shielding pipe 9.

Each shielding pipe 9 is of metallic design, insulated with paper on the outside and projects, by way of one pipe end, through an opening 5 into the hollow space 3 in the electrode 2. Each conductor 19 is routed through a shielding pipe 9 into the hollow space 3 in the connection element 1. The conductors 19 are electrically connected to one another within the hollow space 3.

The connection element 1 of this exemplary embodiment differs from the connection element 1 of the first exemplary embodiment which is illustrated in FIG. 1 in that, in addition to the paper insulation 7, it has insulation elements 11, 13 which are composed of pressboard and which are each arranged around a section of the electrode 2 and the paper insulation 7 of said electrode.

In this case, two first insulation elements 11 are each designed in the form of a cap around a cylinder base surface and a region of the cylinder lateral surface of the electrode 2, which region adjoins said cylinder base surface, and have a hole which corresponds to the opening 5 in the cylinder base surface and through which a shielding pipe 9 is routed into the opening 5.

Two second insulation elements 13 are each arranged around an opening 5 in the cylinder lateral surface. In this case, each second insulation element 13 has a shield-like section 13.1 and a tubular section 13.2. The shield-like section 13.1 surrounds a region of the cylinder lateral surface which contains the respective opening 5 and has a hole which corresponds to the opening 5 and through which a shielding pipe 9 is routed into the opening 5. The tubular section 13.2 extends from the edges of this hole to the outside, so that it forms an extension of the opening 5 in the electrode 2 to the outside and surrounds an end region of the shielding pipe 9 which is routed into the opening 5.

FIG. 3 shows a perspective illustration of a third exemplary embodiment of an electrical connection element 1 for electrically conductively connecting four electrical conductors 19, not shown in FIG. 3, (see FIG. 5) which are each routed in a shielding pipe 9.

The connection element 1 of this exemplary embodiment differs from the connection element 1, which is illustrated in FIG. 2, of the second exemplary embodiment only in that it additionally has a third insulation element 15 which is composed of pressboard, which is of tubular design and which is arranged around the electrode 2 along the longitudinal axis of said electrode. Furthermore, the third insulation element 15 has holes which correspond to the openings 5 in the cylinder lateral surface of the electrode 2 and through which in each case one shielding pipe 9 is routed into the corresponding opening 5. Apart from this, the connection element 1 of this exemplary embodiment and the shielding pipes 9 are designed and arranged in the same way as in the exemplary embodiment which is illustrated in FIG. 2.

FIG. 4 shows a perspective illustration of the third exemplary embodiment, which is illustrated in FIG. 3, of an electrical connection element 1 with shielding pipes 9 as in FIG. 3, wherein each shielding pipe 9 is surrounded by a tubular barrier 17, which is composed of pressboard, outside the connection element 1. Apart from this, the connection element 1 and the shielding pipes 9 are designed and arranged in the same way as in the exemplary embodiment which is illustrated in FIG. 3.

FIG. 5 shows a sectional illustration through the third exemplary embodiment, which is illustrated in FIG. 4, of a connection element 1 for four conductors 19 and also the shielding pipes 9 which carry the conductors 19 and are surrounded by barriers 17.

The conductors 19 are designed in the form of ropes or in the form of strips.

The illustration shows, in particular, that each shielding pipe 9 comprises a metal pipe 9.1, for example a copper pipe, and a pipe paper insulation 9.2 which surrounds the metal pipe 9.1. The metal pipe 9.1 does not serve to carry current, but rather for electrical shielding of the conductor 19. The electrode 2 is preferably electrically connected to the conductors 19 and to the metal pipes 9.1 of the shielding pipes 9 in one location.

The illustration further shows an embodiment of the electrode 2 with three electrode sections 2.1, 2.2, 2.3 and the paper insulation 7 of the said electrode sections, said embodiment being described in detail below with reference to FIG. 7 and it being possible for said embodiment to be replaced by an alternative embodiment according to FIG. 8 or FIG. 9. In this case, a first electrode section 2.1 surrounds an opening 5 in a cylinder base surface of the electrode 2, a second electrode section 2.2 surrounds an opening 5 in the cylinder lateral surface of the electrode 2, and a third electrode section 2.3 connects a first electrode section 2.1 and a second electrode section 2.2 and forms a portion of the cylinder lateral surface of the electrode 2.

Strips and blocks which are used as spacers for the insulation elements 11, 13, 15 and barriers 17 are not illustrated.

Figure 6:
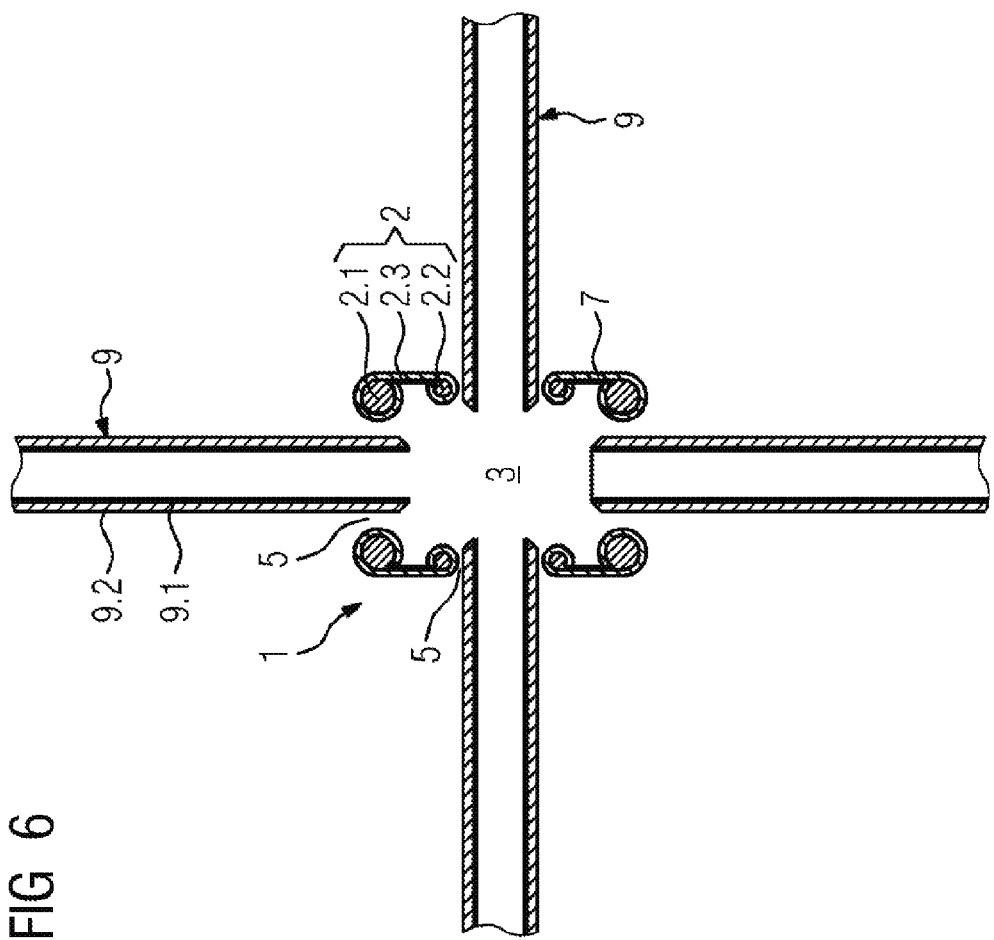
FIG. 6 shows a sectional illustration of the first exemplary embodiment, which is illustrated in FIG. 1, of a connection element for four conductors and also shielding pipes which carry the conductors.

FIG. 6 shows a sectional illustration, which corresponds to FIG. 5, of the first exemplary embodiment, which is illustrated in FIG. 1, of a connection element for four conductors 19, which are not illustrated in FIG. 6, and also shielding pipes 9 which carry the conductors 19. The connection element 1 of this exemplary embodiment differs from the connection element 1 which is illustrated in FIG. 5 in that it does not have any insulation elements 11, 13, 15. Furthermore, the arrangement which is illustrated in FIG. 6 differs from the arrangement which is illustrated in FIG. 5 in that the shielding pipes 9 are not surrounded by barriers 17.

FIG. 7 shows a sectional illustration through a detail of the exemplary embodiment, which is illustrated in FIGS. 5 and 6, of an electrode 2 and the paper insulation 7 of said electrode. The two first electrode sections 2.1, which each surround an opening 5 in a cylinder base surface of the electrode 2, are each of toroidal design. The second electrode sections 2.2, which each surround an opening 5 in the cylinder lateral surface of the electrode 2, are likewise each of toroidal design, but in the form of tori which have a lower thickness than the first electrode sections 2.1. The third electrode sections 2.3, which each connect a first electrode section 2.1 and a second electrode section 2.2 and form a portion of the cylinder lateral surface of the electrode 2, are of hollow-cylindrical design and have a cylinder wall thickness which is lower than the thickness of the first and second electrode sections 2.1, 2.2. The paper insulation 7 surrounds the first and second electrode sections 2.1, 2.2 and also the outer surfaces of the third electrode sections 2.3 and those sections, not illustrated, of the electrode 2 which form the rest of the cylinder lateral surface of the electrode 2.

Analogously to FIG. 7, FIG. 8 shows a second exemplary embodiment of an electrode 2 and the paper insulation 7 of said electrode. The electrode 2 of this exemplary embodiment differs from the electrode 2 which is illustrated in FIG. 7 only in that the second electrode sections 2.2 form tori of the same thickness as the first electrode sections 2.1.

Analogously to FIGS. 7 and 8, FIG. 9 shows a third exemplary embodiment of an electrode 2 and the paper insulation 7 of said electrode. The electrode 2 of this exemplary embodiment differs from the electrodes 2 which are illustrated in FIGS. 7 and 8 in that the first electrode sections 2.1 are each designed as a metal sheet with an edge region which is bent over in relation to the hollow space 3, wherein the metal sheet forms an extension of the third electrode section 2.3.

FIG. 10 schematically shows a transformer 21 with a connection element 1 for four current-carrying electrical conductors 19, three of which conductors are connected to a respective winding 23 of the transformer 21. The fourth conductor 19 leads to a bushing electrode 24 in which a voltage-carrying bushing 25 is connected to a surrounding grounded dome 27 of the transformer 21. If the transformer 21 is a HVDC transformer, the windings 23 are, for example, network windings of the HVDC transformer.

The connection element 1 is designed in the same way as in one of the above-described exemplary embodiments. As in FIG. 5, the conductors 19 are routed in shielding pipes 9 and connected to one another in the hollow space 3 in the electrode 2 of the connection element 1.

The connection element 1 and the shielding pipes 9 are arranged in an oil within a housing 29 (transformer tank) of the transformer 21.

Analogously, the connection element 1 can also be used to connect conductors 19 which are connected to windings 23 of a choke coil.

Although the invention has been more specifically illustrated and described in detail by means of the preferred exemplary embodiments, the invention is not restricted by the examples disclosed, and other variations can be derived therefrom by a person skilled in the art, without departing from the scope of protection of the invention. In particular, the connection element 1 can also be designed to connect more than four conductors 19 by being provided with correspondingly more openings 5.

The invention claimed is:

1. A connection element for electrically conductively connecting at least four electrical conductors, the connection element comprising:
   a metallic electrode having an outer surface and having a hollow space formed therein for bringing together the at least four conductors;
   said electrode being formed with an opening into said hollow space for each said conductor;
   said electrode having at least one electrode section surrounding a respective said opening, said at least one electrode section comprising a metal sheet with an edge region that is bent over towards said hollow space; and
   a paper insulation surrounding at least said outer surface of said electrode.

2. The connection element according to claim 1, wherein each said opening has a round contour.

3. The connection element according to claim 1, wherein said metallic electrode is substantially cylindrical with two cylinder base surfaces and a cylinder lateral surface, and wherein each said cylinder base surface is formed with a respective said opening, and said cylinder lateral surface is formed with at least two said openings.

4. The connection element according to claim 1, wherein said outer surface of said electrode is a smooth surface.

5. The connection element according to claim 1, wherein said electrode has at least one torus-shaped electrode section surrounding a respective said opening.

6. A connection element for electrically conductively connecting at least four electrical conductors, the connection element comprising:
   a metallic electrode having an outer surface and having a hollow space formed therein for bringing together the at least four conductors;
   said electrode being formed with an opening into said hollow space for each said conductor; and
   a paper insulation surrounding at least said outer surface of said electrode; and
   at least one insulation element composed of pressboard and being formed as a cap around a section of said electrode formed with a respective said opening, said at least one insulation element having a hole formed therein arranged above said opening and corresponding to said opening.

7. The connection element according to claim 1, which further comprises at least one insulation element composed of pressboard and having a shield section and a tubular section, wherein said shield section surrounds a region of said electrode which is formed with an opening, and is formed with a hole that is arranged above said opening and corresponds to said opening, and wherein said tubular section extends from the edges of said hole outward, so as to form an extension of said opening to the outside.

8. The connection element according to claim 1, which further comprises at least one insulation element composed of pressboard having a tubular shape and being arranged around said electrode along a longitudinal axis of said electrode, and said at least one insulation element being formed, in the region of said openings in said electrode, with holes that correspond to said openings.

9. The connection element according to claim 1, which further comprises:
   at least one first insulation element composed of pressboard and being formed as a cap around a section of said electrode formed with a respective said opening, said at least one insulation element having a hole formed therein arranged above said opening and corresponding to said opening;
   at least one second insulation element composed of pressboard and having a shield section and a tubular section, wherein said shield section surrounds a region of said electrode which is formed with an opening, and is formed with a hole that is arranged above said opening and corresponds to said opening, and wherein said tubular section extends from the edges of said hole outward, so as to form an extension of said opening to the outside; and
   at least one third insulation element composed of pressboard having a tubular shape and being arranged around said electrode along a longitudinal axis of said electrode, and said at least one third insulation element being formed, in the region of said openings in said electrode, with holes that correspond to said openings.

10. An assembly, comprising:
    a connection element according to claim 1;
    at least four electrical conductors electrically connected to one another by way of said connection element;
    wherein each said conductor is routed through a shielding pipe, through a respective said opening in said connection element, and into said hollow space formed in said connection element, and wherein said conductors are electrically connected to one another in said hollow space in said connection element.

11. The assembly according to claim 9, wherein each said shielding pipe projects, by way of one pipe end, through a respective said opening into said hollow space in said electrode.

12. The assembly according to claim 9, wherein each said shielding pipe is surrounded by a tubular barrier outside said connection element, wherein said tubular barrier is composed of pressboard.

13. The assembly according to claim 9, wherein each said shielding pipe has a metal pipe which is surrounded on the outside by a pipe paper insulation.

14. The assembly according to claim 9, wherein said electrode is electrically connected to said conductors or to said conductors and said shielding pipes in one location.

15. The assembly according to claim 9, wherein said connection element and said shielding pipes are arranged in oil within a housing of a transformer or a choke coil and wherein at least three of said conductors are electrically conductively connected to a respective winding of the transformer or of the choke coil.

\* \* \* \* \*